Oct. 5, 1954 — E. G. CROOKS — 2,690,885
SPOOL OR BOBBIN

Filed May 14, 1952 — 6 Sheets-Sheet 1

INVENTOR
Earl G. Crooks
BY Dowell & Dowell
ATTORNEYS

Oct. 5, 1954     E. G. CROOKS     2,690,885
SPOOL OR BOBBIN Filed May 14, 1952     6 Sheets-Sheet 4

INVENTOR
Earl G. Crooks
BY Dowell N Dowell
ATTORNEYS

Oct. 5, 1954     E. G. CROOKS     2,690,885
SPOOL OR BOBBIN Filed May 14, 1952                                                6 Sheets—Sheet 6

INVENTOR
Earl G. Crooks
BY Dowell M Dowell
ATTORNEYS

Patented Oct. 5, 1954

2,690,885

UNITED STATES PATENT OFFICE 2,690,885

SPOOL OR BOBBIN

Earl G. Crooks, Binghamton, N. Y., assignor to Lestershire Spool and Manufacturing Company, Johnson City, N. Y., a corporation of New York Application May 14, 1952, Serial No. 287,745

9 Claims. (Cl. 242—124)

This invention is a novel improvement in spools, bobbins, pirns, or the like, and the principal object thereof is to provide a spool, bobbin or pirn adapted to contain thread such as nylon or the like, the spool being subjected to very high stresses when the spool is wound in the normal manner, and when subjected to substantial changes in temperatures as encountered during the normal use of the spool or the like.

The principal object of the invention is to provide a spool, bobbin, pirn, or the like having a barrel which may be subjected to tremendous crushing stresses, the barrel being mounted upon a center tube engaging a spindle, the center tube being in the form of a hollow bolt passing through the barrel, and having nuts at each end which are threaded onto the center tube and which effectively prevent elongation of the barrel, the center tube thereby serving by compression against the ends of the barrel to resist the crushing forces on the barrel and maintaining the overall length of the barrel substantially constant notwithstanding any changes in temperature or forces giving rise to any stresses to which the spool, bobbin or pirn may be subjected.

Another object of the invention is to provide a spool, bobbin, pirn or the like in which nuts of conical form engage correspondingly shaped conical bores in the top and base heads, the inner faces of which heads abut against the ends of the barrel, said construction eliminating the necessity of utilizing the usual annular series of screws which are normally employed in securing the top and base heads to the assembly, thereby greatly enhancing the strength of the assembly to such an extent that in practice it is found that the barrel will be fractured before the top and base heads of the spool are pulled or otherwise torn due to internal stresses from the assembly.

Other minor objects of the invention will be hereinafter set forth.

I will explain the invention with reference to the accompanying drawings which illustrate various practical embodiments thereof, to enable others familiar with the art to adopt and use the same; and will summarize in the claims, the novel features of construction, and novel combinations of parts, for which protection is desired.

Figure 1:
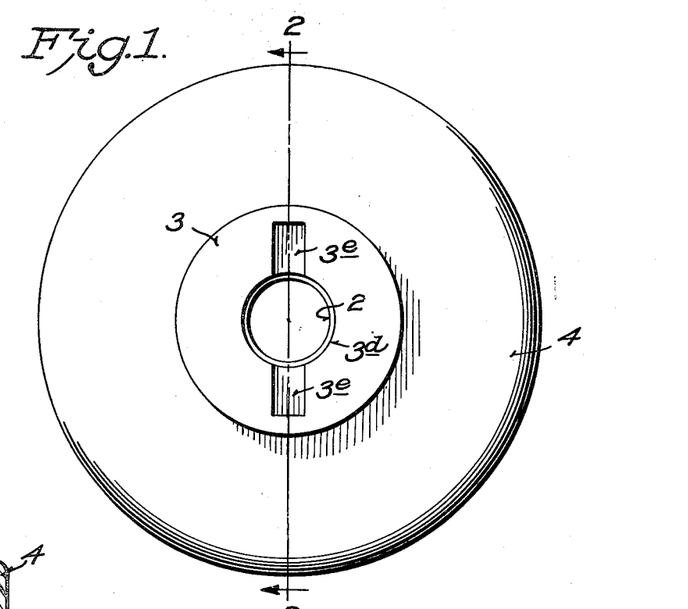
Figure 1 is an end view of one embodiment of my invention.
Figure 2:
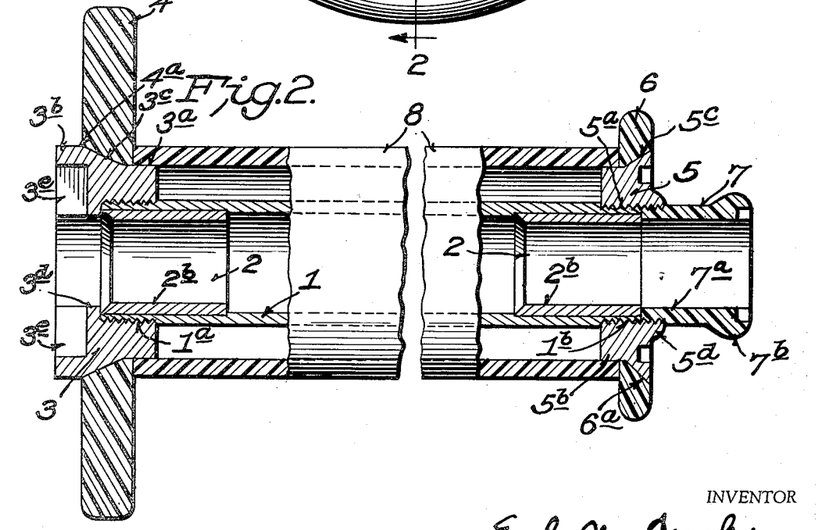
Fig. 2 is a longitudinal section on the line 2—2, Fig. 1.

In Figs. 1 and 2 a twister bobbin is disclosed, the same consisting of a center tube 1 which is threaded at each end as at 1a, 1b, said center tube 1 being preferably formed of aluminum, and having at its ends bushings 2—2 adapted to snugly fit the spindle upon which the bobbin is mounted.

The threaded end 1a of center tube 1 carries a base nut 3 preferably formed of aluminum and having a threaded bore receiving the threads 1a, and nut 3 has an internal cylindrical portion 3a and an outer enlarged cylindrical portion 3b, the portions 3a, 3b being connected by an outwardly flaring conical portion 3c, as shown in Fig. 2. The outer end of the threaded portion of nut 3 terminates in an internal annular flange 3d of slightly greater internal diameter than that of bushing 2; and beyond the shoulder 3d the bore of nut 3 is provided with driving slots 3e for accommodating the driving lugs of the spindle.

The conical portion 3C of nut 3 carries a base head 4 of disc-like form, same being preferably formed of Bakelite, and having a bore 4a of conical shape corresponding with and fitting the conical portion 3c of nut 3, as shown in Fig. 2, the base 4 being retained on the center tube 1 by inter-engagement of the conical faces 4a, 3c of the base head 4 and nut 3 respectively.

At the opposite end of center tube 1 is a top nut 5, also preferably formed of aluminum, having a threaded bore 5a receiving the threads 1b of center tube 1, said nut 5 having an inner portion 5b of same diameter as the inner portion 3a of nut 3, and having at its outer portion a conical enlargement 5c, which is flared outwardly as shown. Nut 5 also has an outwardly projecting portion 5d which extends beyond the outer end of the conical portion 5c, as shown, and is internally threaded, the same forming a continuation of the threaded bore 5a of nut 5.

Upon the nut 5 is a top head 6 having a conical bore 6a conforming in shape with and fitting the conical portion 5c of nut 5, as shown in Fig. 2.

If desired, a handle 7 of Bakelite or the like may be provided, same having a bore 7a and having an enlarged rounded outer end 7b. The inner end of handle 7 is externally threaded and adapted to engage the internal thread 5a of nut 5 abutting the end of center tube 1 and bushing 2, as shown in Fig. 2.

Between the heads 4 and 6 and seating upon the cylindrical portions 3a and 5b of nuts 3 and 5 respectively is a barrel 8, preferably formed of Bakelite or aluminum; the barrel having its ends contacting the heads 4 and 6.

When the parts are assembled, as shown in Fig. 2, and the nuts 3 and 5 screwed up tightly, the barrel 8 will be compressed between the heads 4 and 6 by reason of the engagement of the conical portions 3c and 4a and the conical portions 5c and 6a respectively. When the nuts 3 and 5 are thus tightly screwed up, it is obvious that the pressure of the nuts 3 and 5 against the ends of barrel 8 will effectively prevent elongation of barrel 8, and such arrangement furthermore tends to bow the barrel 8 outwardly, thereby further opposing radial crushing of the barrel 8 under the extreme crushing stresses set up by the nylon or other thread which is wrapped upon the barrel 8. Thus my novel bobbin is prevented from axial elongation since the barrel 8 is in fact reinforced against such elongation by reason of the center tube 1 carrying the nuts 3 and 5, and thus the barrel cannot elongate to such extent that the barrel 8 might be broken or ruptured while in use by any axial stresses. Moreover, the above arching effect of the barrel, due to the provision of the center tube 1 and the nuts 3 and 5 will prevent crushing of the barrel 8 notwithstanding the crushing stresses of the nylon or other thread which is wrapped upon the bobbin.

Another important feature of my assembly is that no annular series of screws are necessary in order to secure the heads 4 and 6 to the bobbin assembly. In the ordinary annular screw arrangement the greatest strength against rupture of the heads has been in the areas immediately adjacent each individual screw. However, in my novel arrangement utilizing single conical inter-engagements of the heads and nuts respectively, the area of strength extends entirely around each of the heads in way of the nuts 3 and 5, and such strength is maintained constant; and thus it has been found in practice that the single conical inter-engagements of the heads and nuts provides a very much stronger arrangement, and that in spite of the stresses on the heads caused by the nylon thread, when wrapped upon the bobbin, the heads 4 and 6 will not warp, become deformed or fractured as readily as when utilizing the old method of securing the heads to the center tube assembly by means of annular series of screws. In my construction the areas of greatest strength exerted by the nuts on the heads extend entirely around the nuts 3 and 5 and are not localized merely around the heads of the individual screws, as in the constructions heretofore used.

My invention, therefore, provides a novel and efficient means for constructing and assembling spools, bobbins or pirns, and provides a construction in which the assembly may be readily taken apart by removing the handle 7 and the nuts 3 and 5, whereby any of the elements of the assembly which may be injured or deformed or fractured may be readily replaced by a new part and the assembly again put together, as shown in Fig. 2, thereby providing an assembly which will require a minimum maintenance cost due to the ready interchangeability of any and all parts of the assembly, which assembly may be dismantled or put together by an unskilled workman with minimum time and effort. My assembly also provides one in which the spool, bobbin or pirn will mantain constant balance, eliminating pulsating action of the spool, bobbin or pirn when subjected to high rotary speeds.

Figure 3:
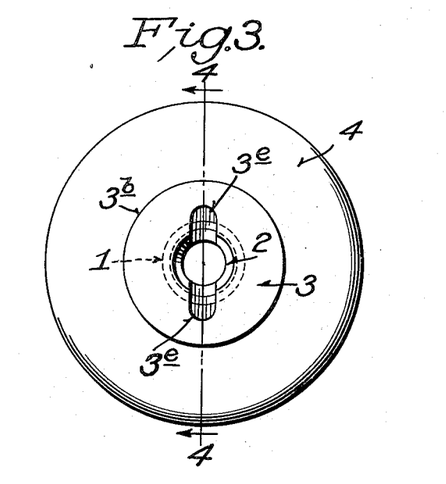
Fig. 3 is an end view of a modified form of the invention.
Figure 4:
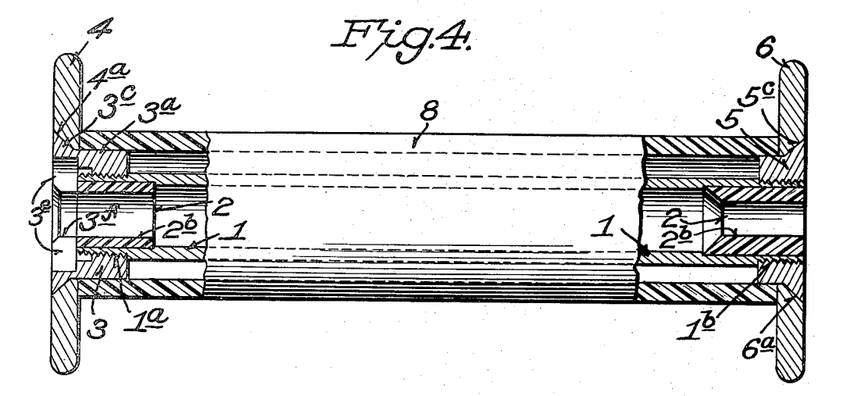
Fig. 4 is a longitudinal section on the line 4—4, Fig. 3.

Figs. 3 and 4 disclose a somewhat similar modification, similar parts being similarly numbered. In this modification the center tube 1 is also preferably made of aluminum, and the barrel 8 is preferably made of Bakelite, while the heads 4 and 6 may be of Bakelite or any desired material. The nuts 3 and 5 are of aluminum but may be of any other desired material.

In this modification the outer face of the nut 3 terminates substantially flush with the outer face of the base head 4, which base head is provided with the opposed driving notches 3e as in Figs. 1 and 2; and nut 3 is provided with a central bore 3f which is of the same diameter as that of the bushing 2. In this modification the handle 7 shown in Fig. 2 is omitted, the nut 5 terminating flush with the outer face of top head 6. Aside from the above modifications, the construction of the bobbin shown in Figs. 3 and 4 is substantially identical with that shown in Figs. 1 and 2, and the various elements thereof are readily replaceable in the same manner as previously described with respect to Figs. 1 and 2.

Figures 5, 6:
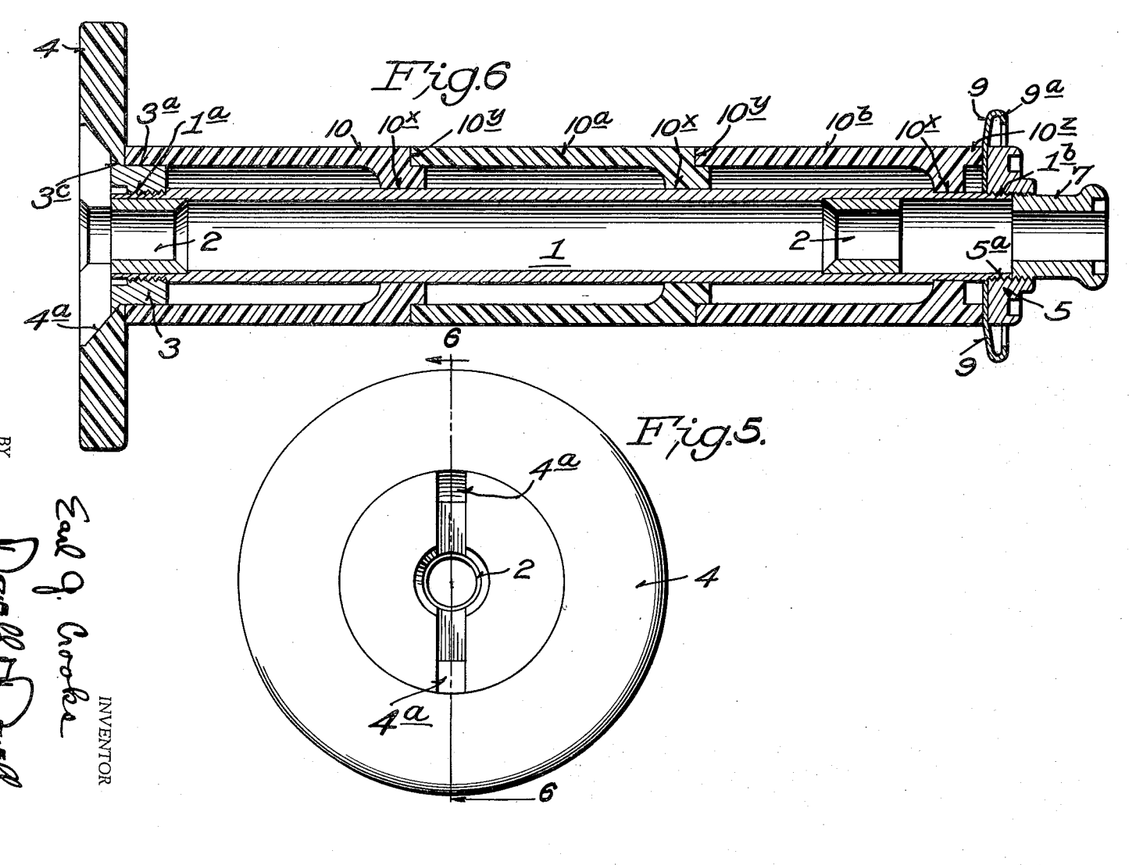
Fig. 5 is an end view of a further modified form of the invention.
Fig. 6 is a longitudinal section on the line 6—6, Fig. 5.

In Figs. 5 and 6 another modification is shown in which similar parts are similarly numbered. In this modification the aluminum center tube 1 is threaded as at 1a, 1b at its ends and may be provided with bushings 2—2 as in the previous modifications. In this modification the nut 3 has a bore which is internally threaded to receive external threads 1a of center tube 1, and its inner end is cylindrical as at 3a. The outer end of the nut 3 has a conical enlargement 3c engaging a conical recess 4a in the base head 4, which latter is preferably formed of Bakelite. The nut 5 at the opposite end of center tube 1 is internally threaded as at 5a to engage the threads 1b of center tube 1, and nut 5 engages at its inner face a head member 9 preferably formed of steel, the same being in the form of a disc having a bore fitting around the center tube 1 and having its periphery rolled outwardly and over as at 9a, in the usual manner so as to prevent the thread from snagging or catching on the end of the bobbin. In this modification the spool, bobbin or pirn may be provided with a handle 7 in the same manner shown in Fig. 2. In this modification, however, the barrel is made up of aligned sections 10, 10a and 10b, although a greater or lesser number of sections may be used. As shown, the section 10 has its outer end resting upon the shoulder 3a of nut 3 and engaging the base head 4, while its inner end has an internal annular flange 10x which rests upon the periphery of center tube 1. In the inner end of section 10 is an annular recess 10y adapted to receive the end of the next adjacent section 10a, which next adjacent section is also provided with the internal annular shoulder 10x and with the annular recess 10y. The recess 10y of section 10a receives the end of the next adjacent section 10b, which is also provided with an internal annular shoulder 10x, and has an annular projection 10z beyond shoulder 10x which directly engages the inner face of the head member 9. By the above construction the barrel 10, 10a, 10b which is preferably formed of Bakelite is compressed not only between the heads 4 and 9 by the nuts 3 and 5, but the barrel 10, 10a, 10b is further strengthened against crushing by reason of the internal annular shoulders 10x which directly engage the center tube 1 at spaced intervals, thereby greatly enhancing the ability of the barrel to withstand crushing stresses exerted by the nylon or other material which is wrapped upon the spool or bobbin.

In the assembly shown in Figs. 5 and 6, if any element of the bobbin should become warped, distorted or broken, the same, including any of the sections 10, 10a, 10b of the barrel, may be readily replaced by removal of the screws 3 or 5, inserting the replacement part and reassembling the bobbin as shown in Fig. 6. The sectionalized construction of the barrel greatly enhances the strength of the spool, bobbin or pirn, the center tube preventing elongation of the spool and the shoulders 10x assisting in preventing crushing of the barrel due to stresses imposed thereon by the thread carried by the spool or bobbin. The use of separable barrel sections 10, 10a, 10b moreover permits the spool to be easily adjusted into dynamic balance by loosening the nuts 3 and/or 5 and rotating one or more of the sections 10, 10a or 10b relatively to the other section or sections. This is highly desirable since the spools in operation may revolve at the rate of 18,000 R. P. M. or above, and any off-balance might result in severe pulsation. If on tests for balance one end of the spool should show an off-balance in one direction, and the other end should show off-balance in the other direction, the end sections of the barrel could readily be relatively rotated to bring both ends into dynamic balance.

Figure 7:
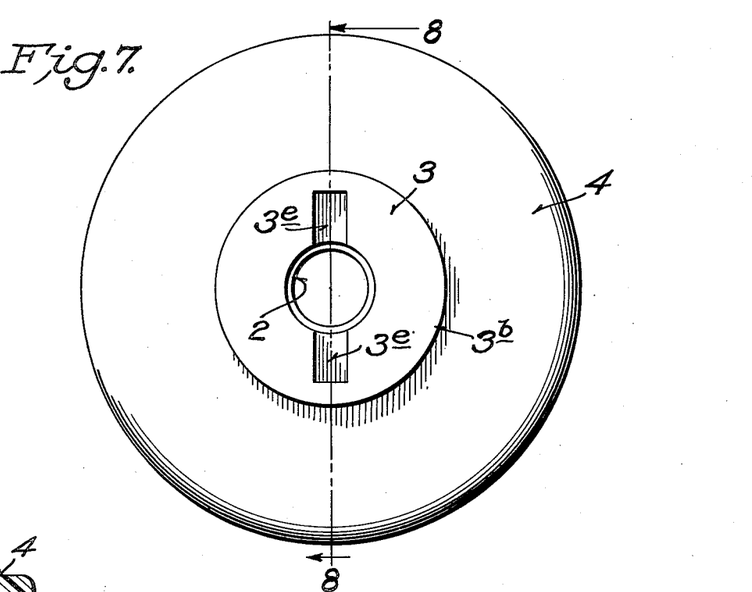
Fig. 7 is an end view of a still further modified form of the invention.
Figure 8:
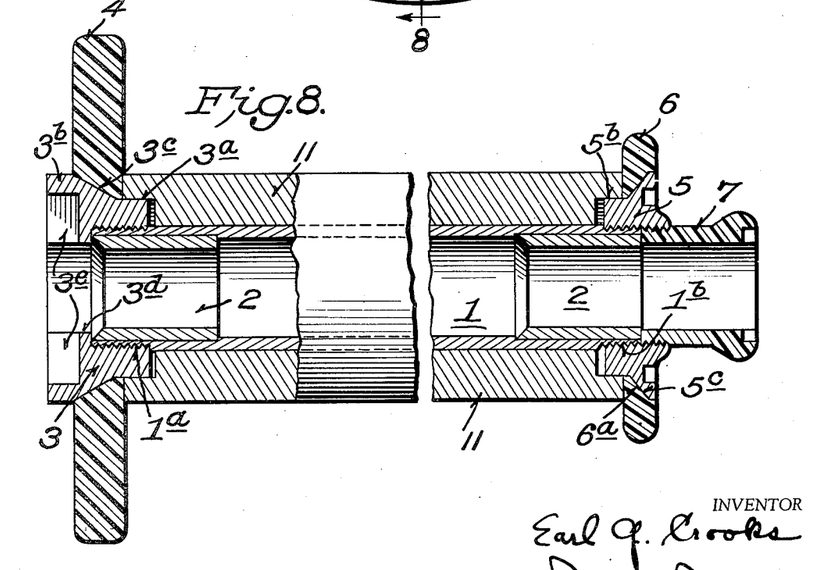
Fig. 8 is a longitudinal section on the line 8—8, Fig. 7.

In Figs. 7 and 8 a further modification is shown which is similar to that shown in Figs. 1 and 2 and similar parts are similarly numbered. However, in this modification the barrel 11 is formed of maple or other wood, and the internal diameter thereof is such as to snugly fit the external diameter of the center tube 1; otherwise the construction is the same as previously described in connection with Figs. 1 and 2; and the operation of the spool, bobbin or pirn is the same as in the previous figures. In this modification the fact that the barrel engages throughout its length the center tube 1 further prevents crushing of the barrel under the influence of crushing stresses imposed thereon by the thread carried by the bobbin.

Figure 9:
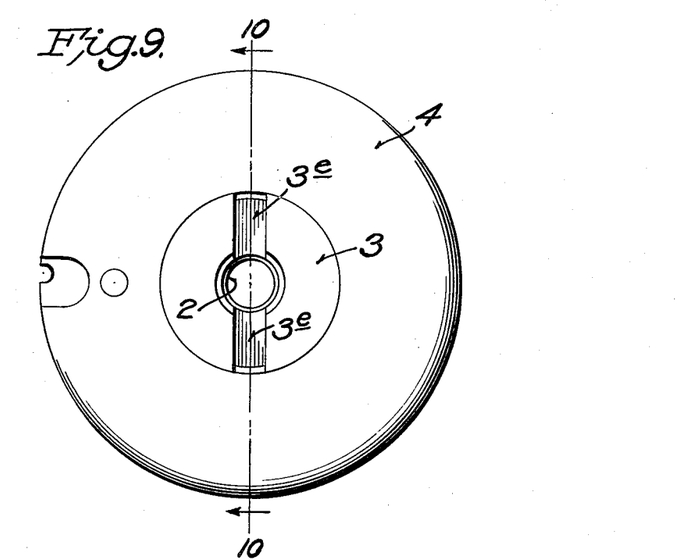
Fig. 9 is an end elevation of still another modified form of the invention.
Figure 10:
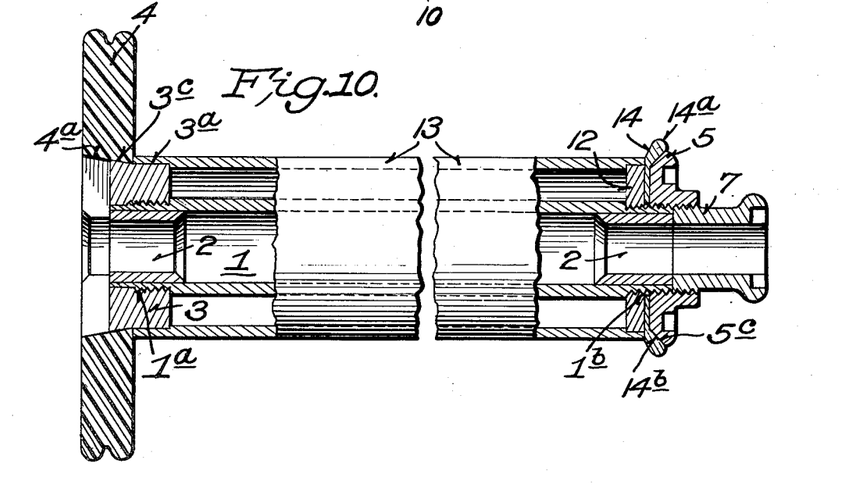
Fig. 10 is a longitudinal section on the line 10—10, Fig. 9.

In Figs. 9 and 10 a still further modification is shown, the same being similar to the preceding figures, and similar parts being similarly numbered. In this modification, however, a washer 12 (Fig. 10) is carried by the threaded portion 1b of center tube 1, and the barrel 13, which is preferably formed of aluminum, has its ends resting upon the portion 3a of nut 3 and upon the washer 12, the ends of the barrel being confined between the head 4 at one end and a top head 14 at the other end, said top head being of disc shape and having an enlarged periphery 14a provided with a conical recess 14b in its outer face which is directly engaged by the conical portion 5c of nut 5. Again, in this modification the barrel 13 of the spool is compressed between the heads 4 and 14 by the conical portions of the nuts 3 and 5 as in the preceding figures, and the bobbin shown in Figs. 9 and 10 operates in substantially the same manner as in the preceding figures.

Figure 4A:
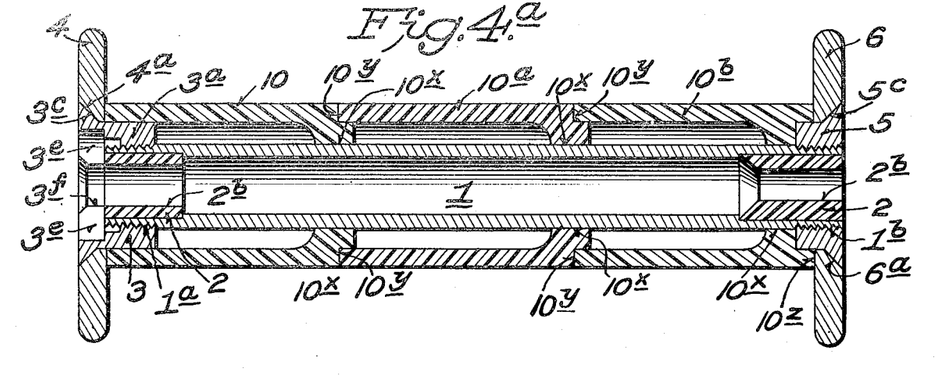
Fig. 4a is a longitudinal section through a further modified form of the invention.

In Fig. 4a a further modification is shown which has portions similar to Figs. 4 and 6 respectively. In this modification the center tube 1 is also preferably made of aluminum, and the barrel 10 preferably made of Bakelite, while the heads 4 and 6 may be made of Bakelite or any desired material. The nuts 3 and 5 are of aluminum but may be of any other desired material.

In this modification the outer face of the nut 3 terminates substantially flush with the outer face of the base head 4, which base head is provided with the opposed driving notches 3e as in Figs. 3 and 4; and nut 3 is provided with a central bore 3f which is of the same diameter as that of bushing 2. In this modification the handle 7 shown in Fig. 2 is omitted, the nut 5 terminating flush with the outer face of top head 6. Aside from the above modification the construction of the bobbin except for the barrel is substantially identical with that shown in Figs. 3 and 4, and the various elements are readily replaceable in the same manner as previously described with respect to Figs. 1 to 4 inclusive.

In this modification, however, the barrel is made up of aligned sections 10, 10a and 10b, although a greater or lesser number of sections may be used. As shown, the section 10 has its outer end resting upon the shoulder 3a of nut 3 and engaging the base head 4, while its inner end has an internal annular flange 10x which rests upon the periphery of center tube 1. In the inner end of section 10 is an annular recess 10y adapted to receive the end of the next adjacent section 10a, which next adjacent section is also provided with the internal annular shoulder 10x and with the annular recess 10y. The recess 10y of section 10a receives the end of the next adjacent section 10b, which is also provided with an internal annular shoulder 10x, and has an annular projection 10z beyond shoulder 10x which directly engages the inner face of the head member 6. By the above construction the barrel 10, 10a, 10b which is preferably formed of Bakelite is compressed not only between the heads 4 and 6 by the nuts 3 and 5, but the barrel 10, 10a, 10b is further strengthened against crushing by reason of the internal annular shoulders 10x which directly engage the center tube 1 at spaced intervals, thereby greatly enhancing the ability of the barrel to withstand crushing stresses exerted by the nylon or other material which is wrapped upon the spool or bobbin.

In the assembly shown in Fig. 4a, if any element of the bobbin should become warped, distorted or broken, the same, including any of the sections 10, 10a, 10b of the barrel, may be readily replaced by removal of the screws 3 or 5, inserting the replacement part and reassembling the bobbin as shown in Fig. 4a. The sectionalized construction of the barrel greatly enhances the strength of the spool, bobbin or pirn, the center tube preventing elongation of the spool and the shoulders 10x assisting in preventing crushing of the barrel due to stresses imposed thereon by the thread carried by the spool or bobbin. The use of separable barrel sections 10, 10a, 10b moreover permits the spool to be easily adjusted into dynamic balance by loosening the nuts 3 and/or 5 and rotating one or more of the section 10, 10a or 10b relatively to the other sections. This is highly desirable since the spools in operation may revolve at the rate of 18,000 R. P. M. or above, and any off-balance might result in severe pulsation. If on tests for balance one end of the spool should show an off-balance in one direction, and the other end should show off-balance in the other direction, the end sections of the barrel could readily be relatively rotated to bring both ends into dynamic balance.

I do not limit my invention to the exact forms shown in the drawings, for obviously changes may be made therein within the scope of the claims.

I claim:

1. A spool, bobbin, or the like, comprising a center tube threaded at each end; nuts threaded onto each end of the tube each nut having a cylindrical portion at its inner end and having at its outer end an outwardly flaring conical portion; heads on said nuts respectively each head having an axial conical bore fitting the conical portion of its related nut; and a barrel having its ends seating upon the cylindrical portions of the nuts respectively and engaging the inner faces of the heads respectively, whereby when the nuts are screwed up tightly the barrel will be tightly compressed between the said heads preventing elongation of said barrel while resisting crushing of the barrel under stresses set up by the thread which is wrapped upon the spool or bobbin, said barrel being formed of aligned sections in frictional contact, each section having an internal annular flange at one end seating upon the center tube; said annular flanges engaging the center tube at spaced intervals thereby enhancing the resistance of the barrel to crushing stresses; and the sections being relatively rotatable to bring the spool into dynamic balance.

2. A spool, bobbin, or the like, comprising a center tube threaded at each end; nuts threaded onto each end of the tube each nut having a cylindrical portion at its inner end and having at its outer end an outwardly flaring conical portion; heads on said nuts respectively each head having an axial conical bore fitting the conical portion of its related nut; and a barrel having its ends seating upon the cylindrical portions of the nuts respectively and engaging the inner faces of the heads respectively, whereby when the nuts are screwed up tightly the barrel will be tightly compressed between the said heads preventing elongation of said barrel while resisting crushing of the barrel under stresses set up by the thread which is wrapped upon the spool or bobbin, said barrel comprising a wooden sleeve of internal diameter conforming with and engaging the external wall of the center tube.

3. A spool bobbin or the like, comprising a center tube threaded at each end; nuts threaded onto each end of the tube each having an outwardly flaring conical portion; heads contacting said nuts each having an axial conical recess fitting the conical portion of its related nut; and a barrel engaging the inner faces of the heads respectively; one head comprising a metallic disc having a thickened periphery provided with the conical recess in its outer face engaging the conical portion of the related nut.

4. A spool, bobbin, or the like, comprising a center tube externally threaded at each end; a base nut threaded onto one end of the tube having a cylindrical portion at its inner end and having at its outer end an outwardly flaring conical portion; a base head on said nut having an axial conical bore fitting the conical portion of said nut; a top nut threaded onto the opposite end of said tube and having a cylindrical portion at its inner end and having at its outer end an outwardly flaring conical portion; a top head on said top nut having an axial conical recess fitting the conical portion of said top nut; and a barrel having its ends seating upon the cylindrical portions of the base and top nuts respectively and engaging the inner faces of the base and top heads respectively, whereby when the nuts are screwed up tightly the barrel will be compressed between the said heads, and the pressure of said nuts will prevent elongation of said barrel while resisting crushing of the barrel under stresses set up by the thread wrapped upon the spool or bobbin, a tubular handle having an externally threaded inner end engaging the internal threads of the top nut, and having a bore therethrough; said handle abutting the adjacent end of the tube.

5. A spool, bobbin, or the like, comprising a center tube externally threaded at each end; a base nut threaded onto one end of the tube having a cylindrical portion at its inner end and having at its outer end an outwardly flaring conical portion; a base head on said nut having an axial conical bore fitting the conical portion of said nut; a top nut threaded onto the opposite end of said tube and having a cylindrical portion at its inner end and having at its outer end an outwardly flaring conical portion; a top head on said top nut having an axial conical recess fitting the conical portion of said top nut; and a barrel having its ends seating upon the cylindrical portions of the base and top nuts respectively and engaging the inner faces of the base and top heads respectively, whereby when the nuts are screwed up tightly the barrel will be compressed between the said heads, and the pressure of said nuts will prevent elongation of said barrel while resisting crushing of the barrel under stresses set up by the thread wrapped upon the spool or bobbin, said barrel being formed of aligned Bakelite sections in frictional contact, each section having an internal annular flange at one end seating upon the center tube; the sections having annular shoulders in their ends between adjacent sections receiving the ends of the said adjacent section; said annular flanges engaging the center tube at spaced intervals thereby enhancing the resistance of the barrel to crushing stresses; and the sections being relatively rotatable to bring the spool into dynamic balance.

6. A spool, bobbin, or the like, comprising a center tube externally threaded at each end; a base nut threaded onto one end of the tube having a cylindrical portion at its inner end and having at its outer end an outwardly flaring conical portion; a base head on said nut having an axial conical bore fitting the conical portion of said nut; a top nut threaded onto the opposite end of said tube and having a cylindrical portion at its inner end and having at its outer end an outwardly flaring conical portion; a top head on said top nut having an axial conical recess fitting the conical portion of said top nut; and a barrel having its ends seating upon the cylindrical portions of the base and top nuts respectively and engaging the inner faces of the base and top heads respectively, whereby when the nuts are screwed up tightly the barrel will be compressed between the said heads, and the pressure of said nuts will prevent elongation of said barrel while resisting crushing of the barrel under stresses set up by the thread wrapped upon the spool or bobbin, said barrel comprising a wooden sleeve of internal diameter conforming with and engaging the external wall of the center tube.

7. A spool, bobbin, or the like, comprising a center tube externally threaded at each end; bushings within the tube adjacent its ends; a base nut threaded onto one end of the tube having a cylindrical portion at its inner end and having at its outer end an outwardly flaring conical portion, the outer end of said nut having diametrically opposed driving slots, and said nut having an axial bore therethrough of greater diameter than the bore of said bushings; a base head on said nut having an axial conical bore fitting the conical portion of said nut; a top nut threaded onto the opposite end of said tube and having a cylindrical portion at its inner end and having at its outer end an outwardly flaring conical portion, said top nut having an axial bore therethrough of greater diameter than the bore of said bushings; a top head on said top nut having an axial conical bore fitting the conical portion of said top nut; and a barrel having its ends seating upon the cylindrical portions of the base and top nuts respectively and engaging the inner faces of the base and top heads respectively, whereby when the nuts are screwed up tightly the barrel will be compressed between the said heads, and the pressure of said nuts will prevent elongation of said barrel, while resisting crushing of the barrel under stresses set up by the thread wrapped upon the spool or bobbin, a tubular handle having an externally threaded inner end engaging the internal threads of the top nut, and having a bore therethrough of larger diameter than such bushings, said handle abutting the adjacent ends of the tube and bushing.

8. A spool, bobbin, or the like, comprising a center tube externally threaded at each end; bushings within the tube adjacent its ends; a base nut threaded onto one end of the tube having a cylindrical portion at its inner end and having at its outer end an outwardly flaring conical portion, the outer end of said nut having diametrically opposed driving slots, and said nut having an axial bore therethrough of greater diameter than the bore of said bushings; a base head on said nut having an axial conical bore fitting the conical portion of said nut; a top nut threaded onto the opposite end of said tube and having a cylindrical portion at its inner end and having at its outer end an outwardly flaring conical portion, said top nut having an axial bore therethrough of greater diameter than the bore of said bushings; a top head on said top nut having an axial conical bore fitting the conical portion of said top nut; and a barrel having its ends seating upon the cylindrical portions of the base and top nuts respectively and engaging the inner faces of the base and top heads respectively, whereby when the nuts are screwed up tightly the barrel will be compressed between the said heads, and the pressure of said nuts will prevent elongation of said barrel, while resisting crushing of the barrel under stresses set up by the thread wrapped upon the spool or bobbin, said barrel being formed of aligned Bakelite sections in frictional contact, each section having an internal annular flange at one end seating upon the center tube; the sections having annular shoulders in their ends between adjacent sections receiving the ends of the said adjacent section; said annular flanges engaging the center tube at spaced intervals thereby enhancing the resistance of the barrel to crushing stresses; and the sections being relatively rotatable to bring the spool into dynamic balance.

9. A spool, bobbin, or the like, comprising a center tube externally threaded at each end; bushings within the tube adjacent its ends; a base nut threaded onto one end of the tube having a cylindrical portion at its inner end and having at its outer end an outwardly flaring conical portion, the outer end of said nut having diametrically opposed driving slots, and said nut having an axial bore therethrough of greater diameter than the bore of said bushings; a base head on said nut having an axial conical bore fitting the conical portion of said nut; a top nut threaded onto the opposite end of said tube and having a cylindrical portion at its inner end and having at its outer end an outwardly flaring conical portion, said top nut having an axial bore therethrough of greater diameter than the bore of said bushings; a top head on said top nut having an axial conical bore fitting the conical portion of said top nut; and a barrel having its ends seating upon the cylindrical portions of the base and top nuts respectively and engaging the inner faces of the base and top heads respectively, whereby when the nuts are screwed up tightly the barrel will be compressed between the said heads, and the pressure of said nuts will prevent elongation of said barrel, while resisting crushing of the barrel under stresses set up by the thread wrapped upon the spool or bobbin, said barrel comprising a wooden sleeve of internal diameter conforming with and engaging the external wall of the center tube.

References Cited in the file of this patent

UNITED STATES PATENTS

| Number | Name | Date |
| --- | --- | --- |
| 455,453 | Pendleton | July 7, 1891 |
| 1,869,408 | Bungay | Aug. 2, 1932 |
| 1,957,860 | Stone | May 8, 1934 |
| 2,190,013 | Byers | Feb. 13, 1940 |
| 2,304,922 | Hosfield | Dec. 15, 1942 |
| 2,542,554 | Miller | Feb. 20, 1951 |

FOREIGN PATENTS

| Number | Country | Date |
| --- | --- | --- |
| 25,353 | Great Britain | Nov. 25, 1909 |
| 361,928 | Great Britain | Nov. 27, 1931 |